United States Patent
Thompson et al.

(10) Patent No.: US 10,174,585 B2
(45) Date of Patent: Jan. 8, 2019

(54) SELF-REGULATING SURPLUSSING CHECK VALVE

(71) Applicant: FORUM ENERGY TECHNOLOGIES (UK) LIMITED, Aberdeen (GB)

(72) Inventors: John Thompson, Newcastle-upon-Tyne (GB); Paul Chubbock, Newcastle-upon-Tyne (GB)

(73) Assignee: FORUM ENERGY TECHNOLOGIES (UK) LIMITED, Aberdeen (GB)

( * ) Notice: Subject to any disclaimer, the term of this patent is extended or adjusted under 35 U.S.C. 154(b) by 391 days.

(21) Appl. No.: 14/652,154

(22) PCT Filed: Dec. 16, 2013

(86) PCT No.: PCT/GB2013/053306
§ 371 (c)(1),
(2) Date: Jun. 15, 2015

(87) PCT Pub. No.: WO2014/096795
PCT Pub. Date: Jun. 26, 2014

(65) Prior Publication Data
US 2015/0322743 A1    Nov. 12, 2015

(30) Foreign Application Priority Data
Dec. 19, 2012 (GB) .................................. 1222926.6

(51) Int. Cl.
*E21B 21/10* (2006.01)
*E21B 34/04* (2006.01)
(Continued)

(52) U.S. Cl.
CPC .............. *E21B 34/04* (2013.01); *E21B 21/10* (2013.01); *E21B 33/038* (2013.01); *E21B 34/00* (2013.01);
(Continued)

(58) Field of Classification Search
CPC ........ E21B 21/10; E21B 33/038; E21B 34/00; E21B 34/04; F16K 15/025
See application file for complete search history.

(56) References Cited

U.S. PATENT DOCUMENTS 5,071,288 A * 12/1991 Brisco ................. E02B 17/0008
137/70
5,234,023 A * 8/1993 Lai ........................ F16K 17/065
137/478

(Continued)

FOREIGN PATENT DOCUMENTS

FR    2388182 A1    11/1978
GB    1591595 A     6/1981
(Continued)

OTHER PUBLICATIONS

International Search Report, Written Opinion, PCT/GB2013/053306, dated Jun. 3, 2014.

*Primary Examiner* — Matthew R Buck
(74) *Attorney, Agent, or Firm* — Patterson + Sheridan LLP

(57) ABSTRACT

A check valve assembly (100, 200) is provided for subsea applications. The check valve assembly comprises a housing (102, 202), having an inlet port (106, 206) and an outlet port (108, 208) forming an internal fluid passageway through the housing; a valve member (112, 212), moveable within the internal fluid passageway between a first position, where fluid flow through the internal fluid passageway is prevented, and a second position, where fluid flow through the internal fluid passageway is permitted; a biasing member
(Continued)

(110, 210), adapted to urge the valve member into the first position at a predetermined cracking force, and a pressure interface (116, 216). The pressure interface operatively links the valve member and an external fluid of a region exterior of the check valve assembly so as to provide a supplemental force, proportional to the ambient pressure of the external fluid, adapted to urge the valve member towards the first position.

13 Claims, 7 Drawing Sheets

(51) Int. Cl.
    *F16K 15/02*     (2006.01)
    *E21B 33/038*     (2006.01)
    *E21B 34/00*     (2006.01)

(52) U.S. Cl.
    CPC ....... *F16K 15/025* (2013.01); *Y10T 137/7904* (2015.04); *Y10T 137/7922* (2015.04)

(56) References Cited

U.S. PATENT DOCUMENTS

| | | | | |
|---|---|---|---|---|
| 6,009,950 | A * | 1/2000 | Cunningham | E21B 33/038 166/344 |
| 7,520,291 | B2 * | 4/2009 | Watson | F16K 17/046 137/494 |
| 8,186,440 | B2 * | 5/2012 | Tveiten | E21B 43/123 137/538 |
| 8,919,730 | B2 * | 12/2014 | Vick, Jr. | F16K 31/086 166/66.5 |
| 9,441,452 | B2 * | 9/2016 | Donald | E21B 33/035 |
| 2004/0026085 | A1 | 2/2004 | Vacik et al. | |
| 2004/0186420 | A1 | 9/2004 | June | |
| 2012/0273220 | A1 * | 11/2012 | Ezekiel | F16K 17/04 166/360 |

FOREIGN PATENT DOCUMENTS

| | | | | |
|---|---|---|---|---|
| GB | 2460336 A | * | 12/2009 | ............. E21B 34/04 |
| WO | 98/039548 A1 | | 9/1998 | |
| WO | 00/04274 A1 | | 1/2000 | |

\* cited by examiner (a)

(b)

(c)

SELF-REGULATING SURPLUSSING CHECK VALVE

The present invention relates generally to the field of subsea pipelines and manifolds, and in particular, to the field of subsea fluid connections having check valves. Even more particularly, the present invention relates to subsea connections having integral surplussing check valves with variable cracking pressure.

INTRODUCTION

Often, hydrocarbons, such as oil and gas, are deposited in rock formation located beneath the seabed. Thus, in order to explore and produce the hydrocarbons, wellbores, associated ancillary equipment and pipelines have to be installed subsea. The wellbore- and ancillary equipment, such as seabed pipelines and pigging equipment (Pipeline Inspection Gauge), generally require the use of high-pressure lines/hoses, couplings and valves, in order to manage fluid flow (e.g. hydrocarbons, drilling fluids etc.) between the reservoir and/or subsea production facilities. The extreme deep-sea pressures the equipment may be exposed to during deep-water operations, can pose considerable challenges to developers and engineers alike.

FIG. 1 shows a simplified example of a typical offshore setup for servicing pipelines or other subsea equipment using a surface vessel 10 and a hose 12. In this particular example, pigging operations may be conducted on pipelines 14 that have been laid on the seabed 16 and which have an internal pressure at atmospheric pressure. Here, the labels $P_{h-1}$, $P_{h-2}$, $P_{h-3}$, $P_{h-4}$ illustrate the hydrostatic pressure at various depths subsea. Understandably, the hydrostatic pressure $P_{h-4}$ is considerably higher than the hydrostatic pressure $P_{h-1}$. Given that the inner pressure of the pipeline 14 is at atmospheric pressure, there may be a significant pressure differential between the pipeline interior and $P_{h-4}$. Consequently, before it is possible to inspect, clean or flush the pipeline 14, it would need to be flooded in order to equalise the internal pressure (at atmospheric pressure) with the external deep-water pressure $P_{h-4}$. Flooding of the pipeline is usually achieved by a hose 12 that is extended from the surface vessel 10 and through which filtered seawater and/or cleaning chemicals are supplied into the pipeline 14. The extended hose 12 is under an internal pressure that is suitable to withstand the external deep-water pressure ($P_{h-1}$ to $P_{h-4}$) and therefore prevent hose collapse. When the hose 12 is opened to the pipeline 14, the considerable pressure differential causes the fluid to rush into the pipeline 14. The extreme fluid flow and instant loss of internal hose pressure, as well as the considerable external hydrostatic pressure $P_{h-1}$, $P_{h-2}$, $P_{h-3}$, $P_{h-4}$ may cause the hose 12 to collapse. The hose collapse may be prevented by using a hose 12 that is strong enough to withstand the external hydrostatic pressure, but such hoses are likely to be significantly more expensive than an ordinary hose. Also, the depths at which pipelines 14 are laid today are exceeding the capacity of even the best anti-collapse hoses currently available, so that using stronger hoses is neither viable nor cost-effective.

Therefore, in order to prevent or at least minimise the risk of hose collapse during pipeline flooding, check valves 20, such as the Moffat Surplussing Valve™ are used. Typical embodiments of such a check- or surplussing valve are shown in FIGS. 2 (a), (b) and (c). The surplussing valve 20 is bubble tight in its reverse fluid flow direction, allowing the hose 12 to be deployed with an internal hose pressure applied to balance the respective external hydrostatic pressures $P_{h-1}$, $P_{h-2}$, $P_{h-3}$, $P_{h-4}$. As shown in the schematic cross section of FIG. 2 (a), the check valve 20 is specifically designed to only allow fluid flow in the forward direction at a predetermined fluid pressure, also known as "cracking pressure". In particular, the cracking pressure is predetermined by the spring 22, and the valve member 24 is moved downstream when the fluid pressure exceeds the cracking pressure, therefore, opening a fluid flow path through the check valve 20. The internal hose pressure required to prevent hose collapse is directly proportional to the external hydrostatic pressure. Therefore, the cracking pressure of the check valve 20 (i.e. a predetermined spring force provided by spring 22) has to be set to a pressure that is suitable at that specific subsea depth.

For example, the Moffat Surplussing Valve® is manufactured in sizes ranging 1 inch, 2 inch, 3 inch, 4 inch, 6 inch and 8 inch (Nominal Bore), wherein the design pressure of the Moffat Surplussing Valve™ has three main tiers: 414 bar (6,000 psi), 690 bar (10,000 psi) and 1035 bar (15,000 psi), in accordance with typical subsea equipment used in the industry (i.e. flanges, valves, hotstabs etc. are typically pressure rated at 6,000 psi, 10,000 psi or 15,000 psi). Typical "cracking pressures" can be anywhere from 0 to 100 bar (1,450 psi), depending on the subsea depths where the check valve is applied.

During operation, once the hose 12 is connected to the pipeline 14 via the check valve 20, the internal hose pressure is raised beyond the predetermined cracking pressure causing the check valve 20 to open and allow fluid flow into the pipeline 14. However, if the internal hose pressure drops below the cracking pressure, the check valve 20 closes and therefore prevents the hose 12 from collapsing.

It is understandable that check valves 20 used on pipelines 14 laid at different subsea depths require different "cracking pressures" in order to maintain operability of the check valve 20, i.e. open and close the valve 20 to flood the pipeline 14 and prevent hose collapse. Consequently, different check valves have to be either made for different hydrostatic pressures, or existing check valves have to be modified to provide a new cracking pressure suitable for the new hydrostatic pressure.

However, modifying existing check valves or purchasing new check valves suitable for specific hydrostatic pressure ranges can be very time consuming and/or costly. Therefore, it would be desirable to have a check valve that is suitably operable at any hydrostatic pressure.

Accordingly, it is an object of the present invention to provide a check valve with a self-regulating cracking pressure. It is a further object of the present invention to provide a stab connector incorporating a check valve mechanism with a self-regulating cracking pressure.

SUMMARY OF THE INVENTION

Preferred embodiments of the invention seek to overcome one or more of the disadvantages of the prior art.

According to a first aspect of the present invention, there is provided a check valve assembly for subsea applications, comprising:
- a housing, having an inlet port and an outlet port forming an internal fluid passageway through said housing;
- a valve member, moveable within said internal fluid passageway between a first position, where fluid flow through said internal fluid passageway is prevented, and a second position, where fluid flow through said internal fluid passageway is permitted;

a biasing member, adapted to urge said valve member into said first position at a predetermined cracking force, and a pressure interface, operatively linking said valve member and an external fluid of a region exterior of the check valve assembly so as to provide a supplemental force, proportional to the ambient pressure of said external fluid, adapted to urge said valve member towards said first position.

This provides the advantage that the ambient pressure of the external fluid surrounding the check valve actively adjusts the cracking pressure making it suitably operably at any subsea depth. Therefore, where the prior art had to use various different check valves at different subsea depths, a single check valve can now be suitably used for any subsea depth without having to replace, adjust or retrofit the now inoperable existing check valves. In particular, the constant biasing force provided by the biasing member is set to a force that is suitable at the lowest feasible hydrostatic pressure (i.e. operable with pipelines laid at the lowest possible subsea depths), and the "subsea-depth dependent" variable external hydrostatic pressure actively supplements the constant biasing force of the biasing member so as to provide a check valve cracking pressure operably suitable at that specific subsea-depth. Hence, the check valve can be used at any subsea-depth and automatically adjusts its cracking pressure accordingly.

Advantageously, the check valve assembly may comprise a valve seat surface formed within said internal passageway coaxially about said inlet port. Furthermore, the valve member may comprise a first surface, adapted to sealingly engage said valve seat surface when in said first position, and a second surface, operatively linked to said pressure interface. Preferably, the first surface may be located on the upstream side of said valve member, and the second surface may be located at an opposing side to said first surface.

This provides the advantage of a particularly simplistic mechanism that is hard wearing and inexpensive to manufacture.

The pressure interface may comprise at least one external fluid passageway adapted to provide fluid communication between said external fluid and at least part of said second surface. Preferably, the external fluid may be in direct fluid communication with said at least part of said second surface. Advantageously, the at least one external fluid passageway may be fluidly sealed from said internal fluid passageway.

This provides the advantage of minimizing the required parts required to provide the pressure interface between the valve member and the external fluid, subsequently minimizing cost of manufacture.

Alternatively, the pressure interface may comprise an actuator operatively coupled to said valve member and adapted to transfer the force provided by said ambient pressure of said external fluid to said valve member, so as to supplement said predetermined cracking force provided by said biasing member.

Advantageously, the valve member may further comprise a seal portion at the downstream side and at least one flow portion at the upstream side of said valve member, the seal portion being engageable with said housing to prevent fluid flow past said seal portion, and wherein said flow portion is adapted to provide a fluid path between said inlet port and said outlet port. The seal portion may sealingly close said internal fluid path when said valve member is in said first position, and wherein said flow portion provides a flow path through said internal fluid passageway when said valve member is in said second position.

This provides the advantage to maximise stability of the valve member during operation. In particular, either the flow portion or the seal portion are in engagement with the interior walls of the housing at the first position and second position, providing more stability during the movement of the valve member. Preferably, the biasing member may be a spring.

The check valve assembly may further comprise a snap-action mechanism adapted to independently move said valve member into said first position and/or said second position at a predetermined condition. Advantageously, the predetermined condition may be a predetermined distance between the valve member and said first position and/or said second position. Even more advantageously, the snap-action mechanism may comprise at least one magnetic element adapted to provide a force acting on said valve member so as to urge said valve member towards said first position and/or said second position.

This provides the advantage of minimizing potential 'chatter' of the valve member at low pressure differentials, i.e. low subsea depths.

According to a second aspect of the present invention, there is provided a stab connector for providing a fluid flow path between a first fluid reservoir and a second fluid reservoir, comprising:

a stab body coupleable to a receptacle in fluid communication with the second fluid reservoir, and a check valve assembly according to the first aspect of the present invention, operatively arranged within said stab body and adapted to control fluid flow between the first fluid reservoir and the second fluid reservoir.

This provides the advantage that hoses fitted with the stab connector of the second aspect of the present invention are automatically protected from potential collapse in the event of an excessive pressure loss from the hose when connecting to a pipe that has an interior pressure set at approximately atmospheric pressure. Advantageously, the pressure interface of said check valve assembly may be arranged within the distal end portion of said stab body. Even more advantageously, the pressure interface may be fluidly sealed from the first and second fluid reservoir.

BRIEF DESCRIPTION OF THE DRAWINGS

A preferred embodiment of the present invention will now be described, by way of example only and not in any limitative sense, with reference to the accompanying drawings, in which.

DETAILED DESCRIPTION OF THE PREFERRED EMBODIMENTS

Figure 1:
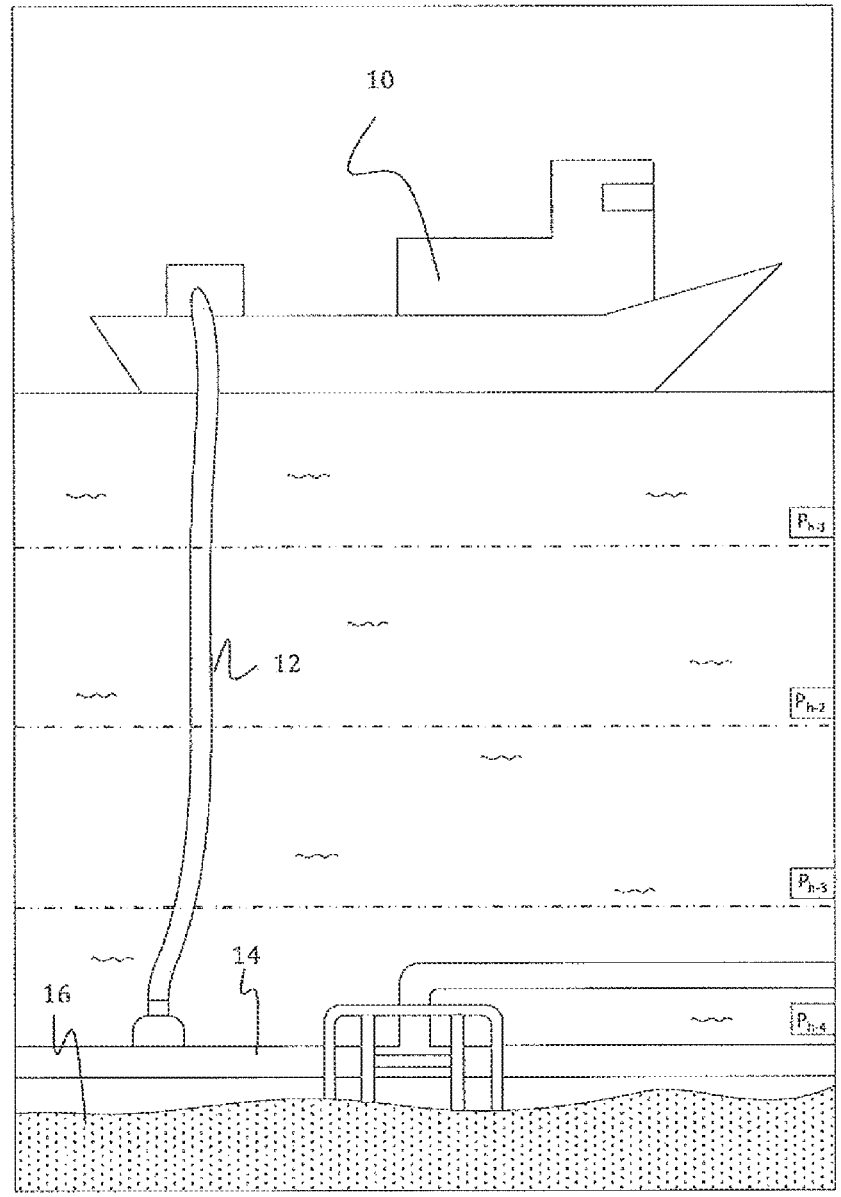
FIG. 1 shows an example of a typical offshore setup when servicing a pipeline, either for installation, repair or pigging utilizing a flexible hose that is extended from a surface vessel.
Figure 2:
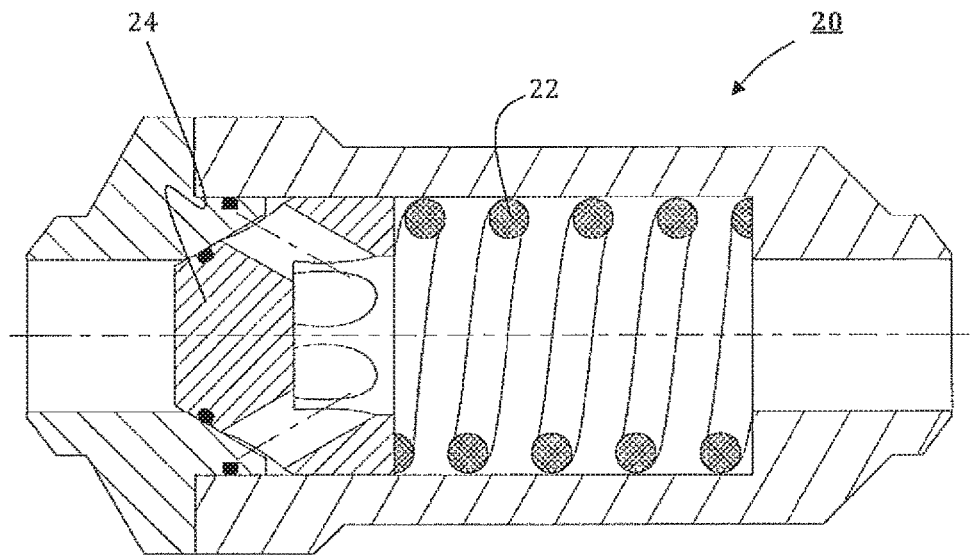
FIG. 2 shows (a) a cross section of a known Surplussing Valve™ (Moffat 2000 Ltd) as currently used to prevent subsea hose collapse, and (b) a typical embodiment of the Surplussing Valve™, as well as, (c) the embodiment complete with Female FIG. 1502 Hammer-Lug Union on the inlet and a Male FIG. 1502+Nut on the outlet.
Figure 2:
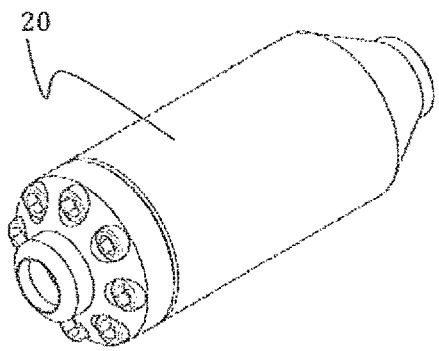
Figure 2:
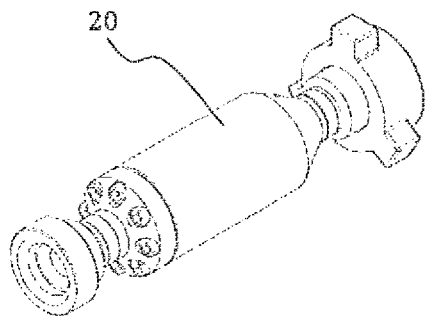
Figure 3:
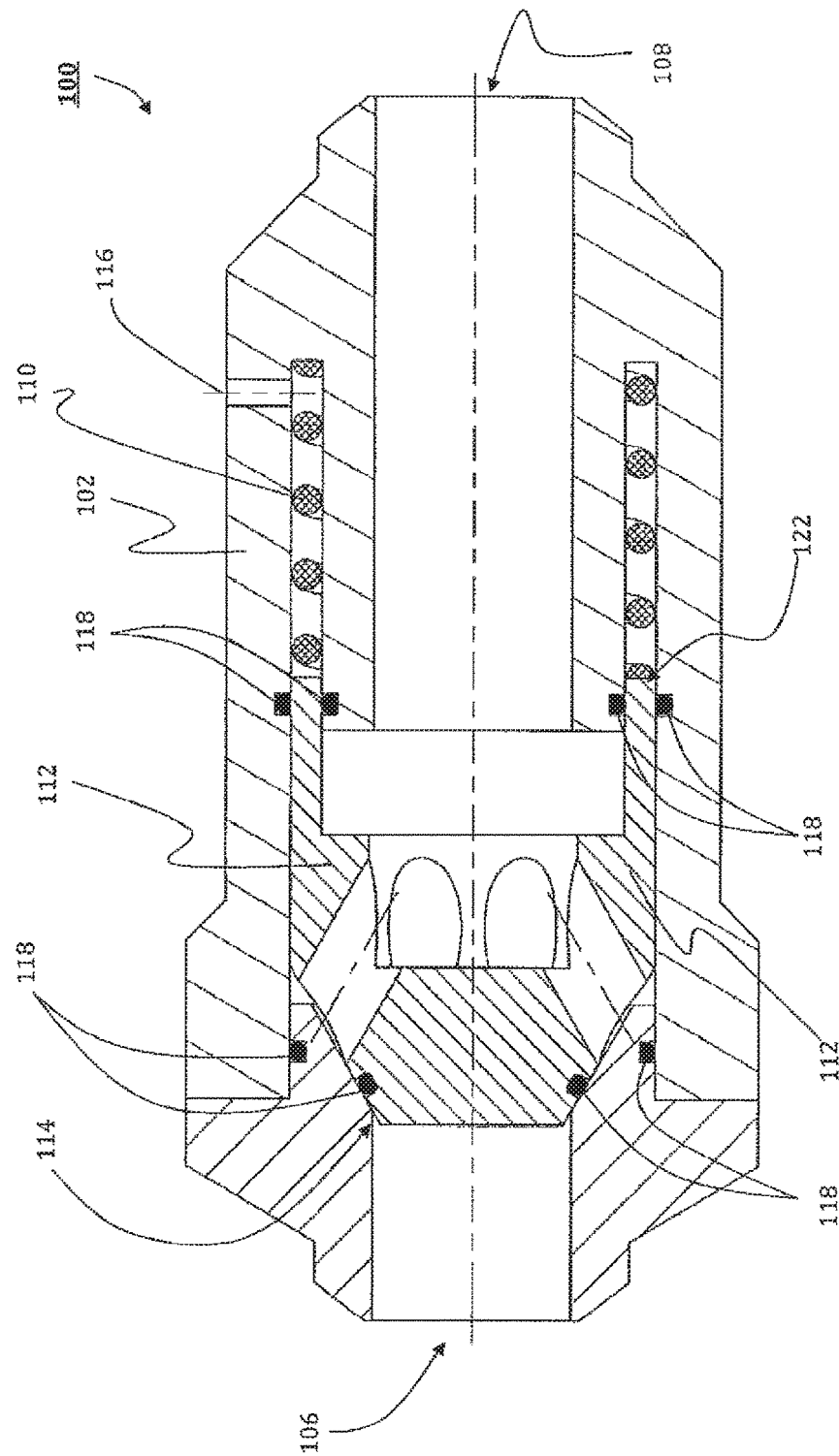
FIG. 3 shows a cross section of a preferred embodiment of the check valve assembly of the present invention.

In accordance with the preferred first embodiment of the present invention, FIG. 3 depicts a check valve assembly 100 having a housing 102, an inlet port 106, an outlet port 108, a biasing member 110 in form of a compression spring, a valve member 112 and corresponding valve seat surface 114, as well as a pressure interface 116 linking the pressure provided by the external fluid with a contact surface of the valve member 112. Sealing members 118 are arranged in the housing 102 and valve member 112 so as to fluidly seal the fluid flow path between inlet port 106 and outlet port 108 when the valve member 112 is in its closed position, and to fluidly seal the fluid flow path between the inlet port 106 and the outlet port 108 from the pressure interface linking the valve member 112 with the pressure provided by the external fluid, independent of the position of the valve member 112.

Figure 4:
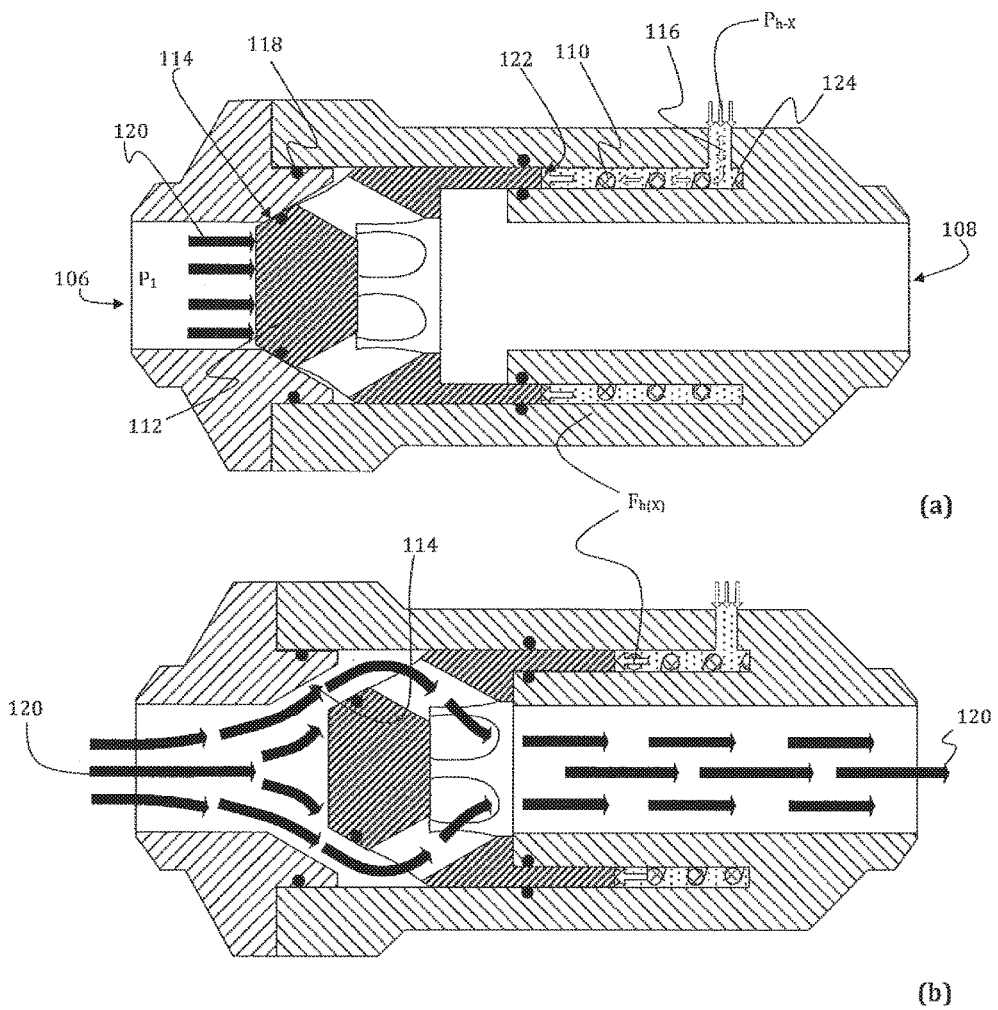
FIG. 4 shows a functional diagram of the check valve assembly of FIG. 3 when (a) in its closed state, and (b) in its open state.

FIG. 4 (a) shows the check valve assembly 100 in situ (connecting hose and pipeline not shown) with the hose fluid 120 pressing against an upstream surface of the valve member 112 with an internal hose pressure $P_1$ provided by a pump (not shown) that is connected to the hose (not shown). A constant biasing force, such as a spring force $F_s$ provided by the compression spring 110, urges the valve member 112 towards the valve seat surface 114, so as to seal the fluid flow path between the inlet port 106 and the outlet port 108. In this particular example, the compression spring 110 is operatively arranged between a downstream surface 122 of the valve member 112 and an interior wall 124 of the housing 102. The pressure interface 116, linking the external fluid (not shown) with the valve member 112, is in form of an open external fluid path between the external fluid (not shown) and the downstream surface 122 of the valve member 112. In accordance with Pascal's law, the hydrostatic pressure $P_{h-x}$ at the subsea depth X is applied directly to the downstream surface 122 of the valve member, so as to supplement the constant spring force $F_s$ provided by the compression spring 110. Therefore, the cracking pressure $P_c(x)$ the hose fluid 120 has to overcome at the subsea depth X to open the fluid flow path of the check valve assembly 100 is determined by the force $F_h(x)$ provided by the hydrostatic pressure $P_{h-x}$ at subsea depth X acting on the downstream surface 122 of the valve member 112, the spring force $F_s$ (constant) provided by the compression spring 110 and the internal pressure of the pipeline $P_1$ (assumed constant) acting on the downstream surface 122.

$$P_c(x)=F_h(x)+F_s+P_1 \quad [1]$$

In order to prevent hose collapse, the hose is pressurized at an internal hose pressure $P_1$ that is directly proportional to the hydrostatic pressure $P_{h-x}$. Hence, the cracking pressure $P_c(x)$ is proportional to the internal hose pressure $P_1$ at subsea depth X, therefore, automatically providing the appropriate cracking pressure $P_c$ suitable for the internal hose pressure $P_1$ at subsea depth X. Any significant pressure drop in the hose (not shown) that reduces $P_1$ to below $P_c(x)$, causes the valve member 112 to move back into its closed position, therefore preventing the hose to collapse.

Figure 5:
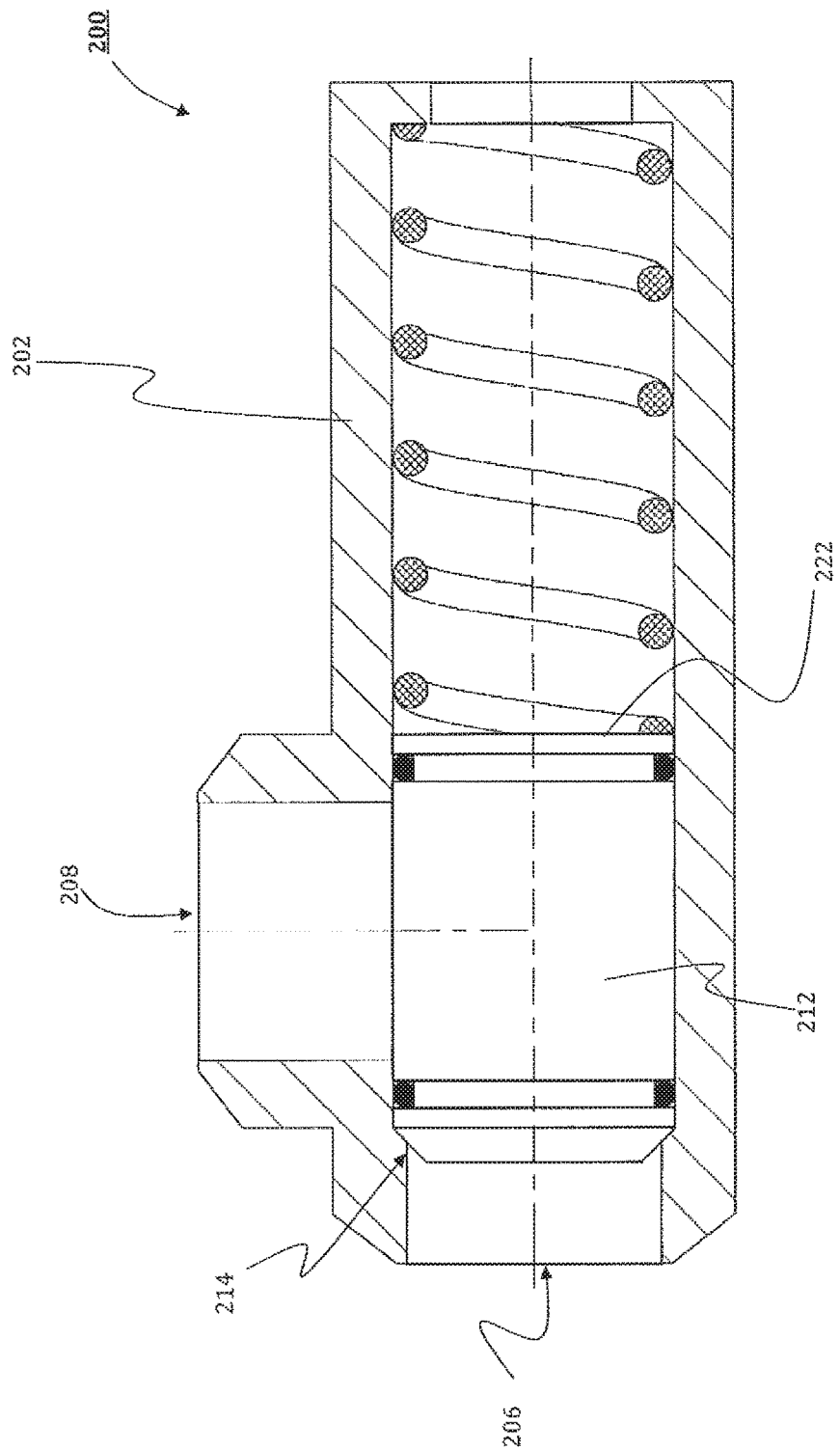
FIG. 5 shows a cross section of an alternative embodiment of the check valve assembly of the present invention.
Figure 6:
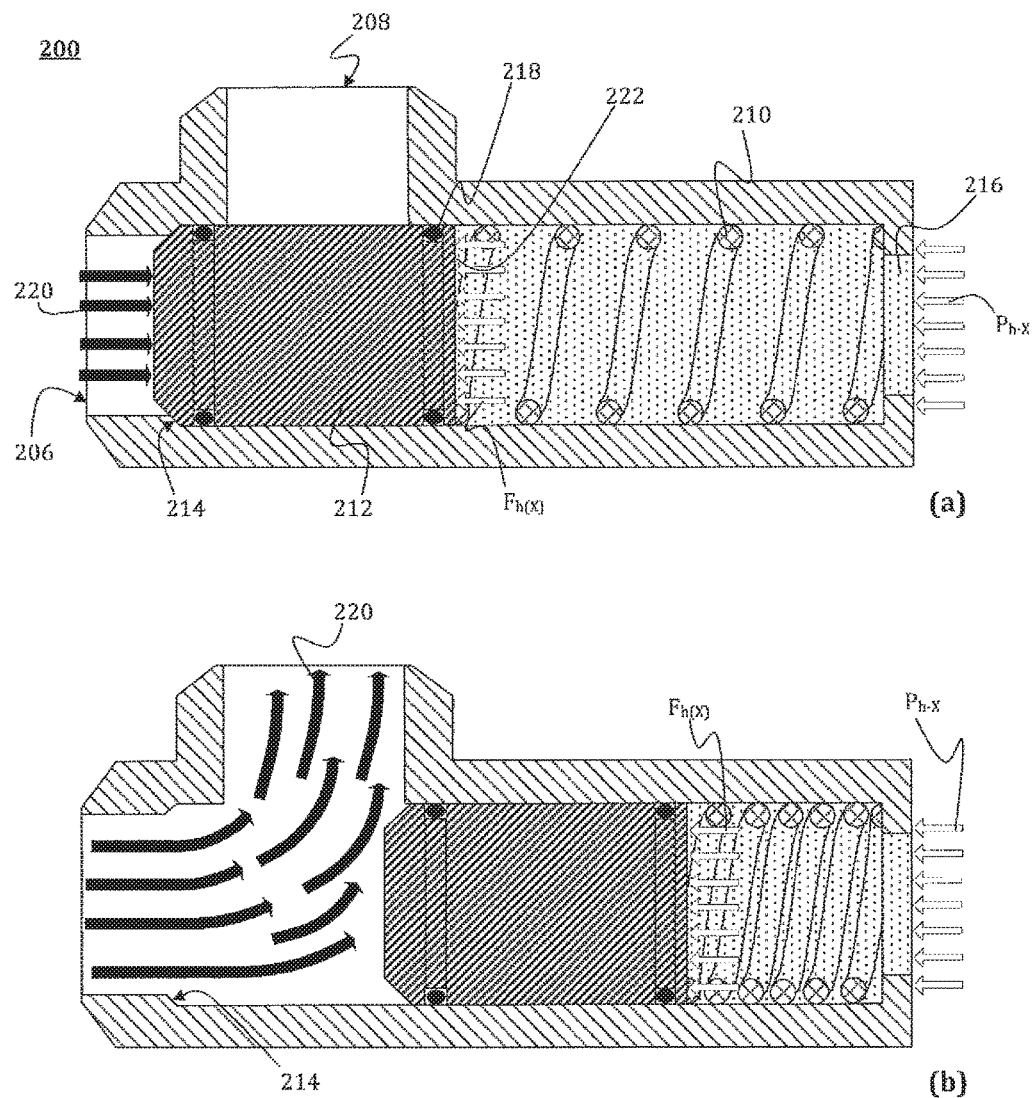
FIG. 6 shows a functional diagram of the check valve assembly of FIG. 5 when (a) in its closed state, and (b) in its open state.

In accordance with an alternative second embodiment, FIG. 5 depicts a check valve assembly 200 comprising a housing 202, an inlet port 206, an outlet port 208, a biasing member 210 in form of a compression spring, a valve member 212, a valve seat surface 214, a pressure interface 216, sealing members 218 and a downstream surface 222. In this particular embodiment, the inlet port 206 and outlet port 208 of the check valve assembly 200 are arranged perpendicular to each other. The pressure interface 216 is arranged in line with the inlet port 206 so that the valve member 212 can move between a closed position, where the fluid flow between inlet port 206 and outlet port 208 is prevented, and an open position, where fluid flow between inlet port 206 and outlet port 208 is permitted. FIG. 6 shows the alternative check valve assembly 200 in situ (without hose and pipeline attachments) (a) in its closed position, where the internal hose pressure $P_1$ is less than the cracking pressure $P_c(x)$ provided at subsea depth X, and (b) in its open position, where the internal hose pressure $P_1$ exceeds the cracking pressure $P_c(x)$ at subsea depth X.

During operation, the internal hose fluid 220 provides a pressure $P_1$ against the valve member 212. As soon as $P_1$ exceeds a cracking pressure $P_c(x)$, which is determined by a force $F_h(X)$ provided by the hydrostatic pressure $P_{h-x}$ at subsea depth X acting on the downstream surface 222 of the valve member 212 and the spring force $F_s$ provided by the compression spring 210, the valve member 212 is moved into its open position so as to provide a fluid flow path between the inlet port 206 and the outlet port 208. The cracking pressure $P_c(x)$ does not include the internal pipeline pressure $P_1$, because the outlet port 208 is perpendicular to the inlet port 206 and pressure interface 216. Any significant pressure drop in the hose reducing $P_1$ to below $P_c(x)$, causes the valve member 212 to move back into its closed position, therefore preventing the hose to collapse.

$$P_c(x)=F_h(X)+F_s \quad [2]$$

Alternatively, the pressure interface 116, 216 may comprise an actuator (not shown) that is adapted to transfer a force proportional to the hydrostatic pressure $P_{h-x}$ provided by the external fluid (not shown) to act on the valve member 112, 212 supplementing the biasing force provided by the biasing member 110, 210 (e.g. spring force provided by a compression spring). The actuator may simply be a plunger arranged within the housing 102, 202 so as to transfer the hydrostatic pressure $P_{h-x}$ of the external fluid onto the downstream surface 122, 222 of the valve member 112, 212.

In yet another alternative arrangement, the actuator (not shown) may be an indirect actuator (not shown) which may comprise an external sensor, adapted to measure the hydrostatic pressure of the external fluid and provide a signal to an actuator mechanism that is capable of providing an actuator force $F_a$ acting on the downstream surface 122, 222 of the valve member 112, 212 to supplement the biasing force of the biasing member 110, 210. The actuator force $F_a$ generated by the actuator mechanism (not shown) may be proportional to the hydrostatic pressure $P_{h-x}$ of the external fluid.

In yet another alternative arrangement, the check valve assembly 100, 200 may comprise a snap-action mechanism (not shown) that is adapted to independently move the valve member 112, 212 into the open and/or closed position at a predetermined condition. The predetermined condition may be a distant threshold between the valve member 112, 212 and the final position of the valve member 112, 212 when in the open position and/or closed position. For example, magnetic elements may be used to provide a pulling force acting on the valve member 112, 212 towards the open and/or closed portion at a predetermined threshold distance.

It is understood by the skilled person in the art that the predetermined constant spring force $F_s$ provided by the biasing member (e.g. compression spring) 110, 210 is made suitable to be operable at any subsea depth, so that the check valve assembly 100, 200 may be reliably used at any subsea depth. It is further understood by the skilled person in the art that the biasing force that is suitable to urge the valve member 112, 212 toward the valve seat surface 114, 214 may be provided by any suitable biasing member 110, 210.

Figure 7:
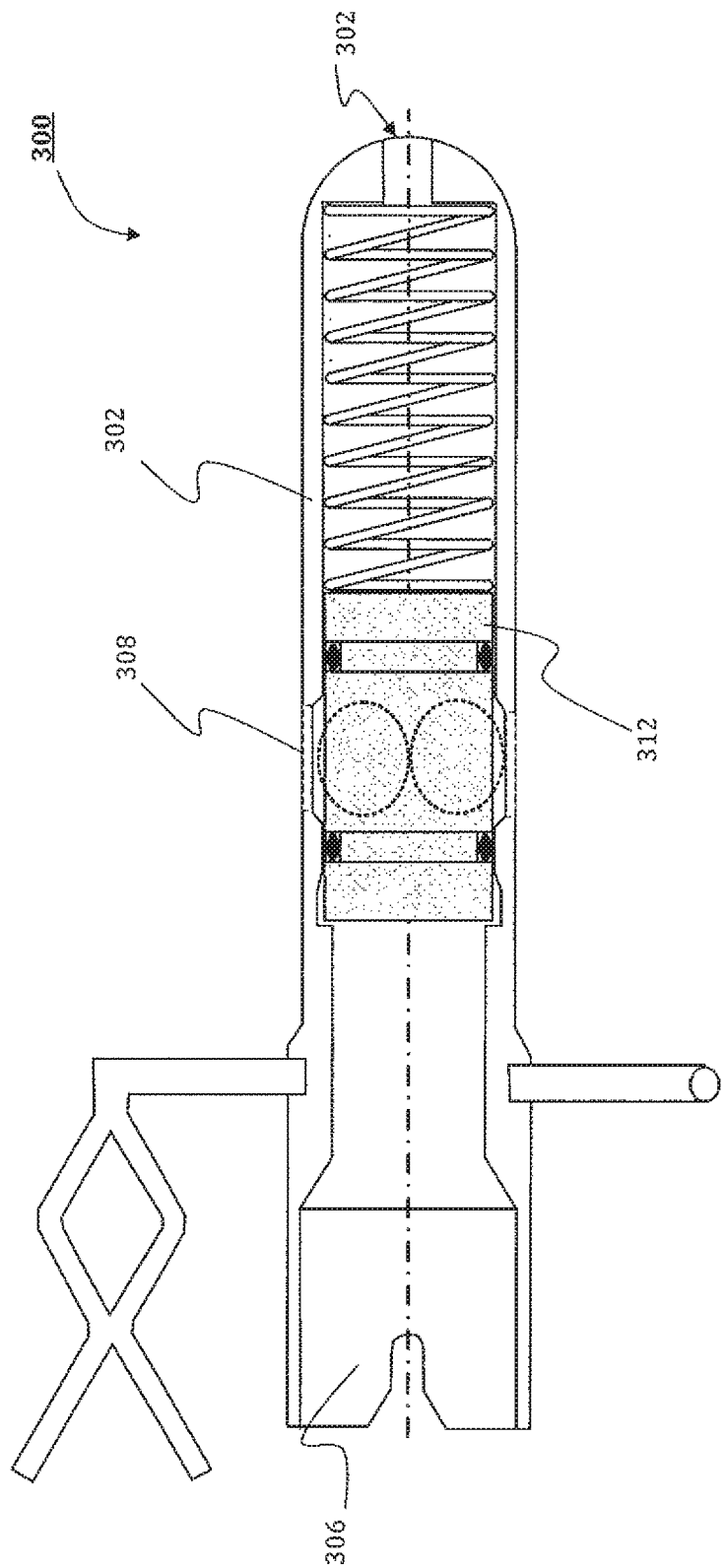
FIG. 7 shows a cross section of an exemplary stab connector incorporating the check valve assembly of the present invention.

FIG. 7 shows an alternative aspect of the present invention in the form of a stab connector 300 that may comprise a check valve assembly in accordance with any one of the first and second embodiment of the present invention.

In this particular example, the stab connector 300 incorporates a variation of the second embodiment of the check valve assembly 200 within its housing 302. During operation, the stab connector 300 is coupled to a hose (not shown) and extended to a subsea location, where a diver or Remotely Operated Vehicle (ROV) inserts the stab connector 300 to a female coupling so as to form a fluid path between the hose and the interior of the pipeline. A pressure interface 316 is provided at the distal end of the stab connector 300 such that it is in fluid communication with the external fluid when the stab connector 300 is locked in the female coupling. When the internal hose pressure $P_1$ exceeds the cracking pressure $P_c(x)$ provided by the spring force $F_s$ and the hydrostatic pressure $P_{h-x}$ at subsea depth X, the valve member 312 moves into its open position, therefore creating a flow path between the inlet port 306 and the outlet port 308 of the stab connector 300.

It will be appreciated by persons skilled in the art that the above embodiments have been described by way of example only and not in any limitative sense, and that various alterations and modifications are possible without departing from the scope of the invention as defined by the appended claims.

The invention claimed is:

1. A subsea check valve assembly for subsea applications, comprising:
   a housing, having an inlet port and an outlet port forming an internal fluid passageway through said housing between the inlet port and the outlet port;
   a valve member comprising a first upstream surface in fluid communication with the inlet port and a second downstream surface, the valve member being moveable within said internal fluid passageway between a first position, where fluid flow through said internal fluid passageway is prevented, and a second position, where fluid flow through said internal fluid passageway is permitted;
   a biasing member, in contact with at least part of said second downstream surface and adapted to urge said valve member into said first position at a predetermined cracking force, and
   a pressure interface to provide a supplemental force to urge said valve member towards said first position, wherein the pressure interface comprises at least one external fluid passageway adapted to provide direct fluid communication between an external fluid located in a region exterior of the subsea check valve and at least part of said second downstream surface, wherein the supplemental force is proportional to the ambient pressure of said external fluid located in the region exterior of the subsea check valve.

2. A subsea check valve assembly according to claim 1, further comprising a valve seat surface formed within said internal fluid passageway coaxially about said inlet port.

3. A subsea check valve assembly according to claim 2, wherein said first upstream surface of said valve member is adapted to sealingly engage said valve seat surface when in said first position.

4. A subsea check valve assembly according to claim 3, wherein said second downstream surface is located at an opposing side to said first upstream surface.

5. A subsea check valve assembly according to claim 1, wherein said at least one external fluid passageway is fluidly sealed from said internal fluid passageway.

6. A subsea check valve assembly according to claim 1, wherein said valve member further comprises a seal portion and at least one flow portion at an upstream side of said valve member, the seal portion being engageable with said housing to prevent fluid flow past said seal portion, and wherein said flow portion is adapted to provide a fluid path between said inlet port and said outlet port through said internal fluid passageway.

7. A subsea check valve assembly according to claim 6, wherein said seal portion sealingly closes said fluid path of said flow portion when said valve member is in said first position, and wherein said flow portion provides fluid flow through said fluid path when said valve member is in said second position.

8. A subsea check valve assembly according to claim 1, wherein said biasing member is a spring.

9. A subsea check valve assembly according to claim 1, further comprising a snap-action mechanism adapted to independently move said valve member into said first position and/or said second position at a predetermined condition.

10. A subsea check valve assembly according to claim 9, wherein said predetermined condition is a predetermined distance between the valve member and said first position and/or said second position.

11. A subsea check valve assembly according to claim 9, wherein said snap-action mechanism comprises at least one magnetic element adapted to provide a force acting on said valve member so as to urge said valve member towards said first position and/or said second position.

12. A stab connector for providing a fluid flow path between a first fluid reservoir and a second fluid reservoir, comprising:
    a stab body coupleable to a receptacle in fluid communication with the second fluid reservoir, and
    a subsea check valve assembly according to claim 1, operatively arranged within said stab body and adapted to control fluid flow between the first fluid reservoir and the second fluid reservoir.

13. A stab connector according to claim 12, wherein the pressure interface of said subsea check valve assembly is arranged within the distal end portion of said stab body.

* * * * *